June 4, 1946.  H. O. STRIKER  2,401,388
DETACHABLE LUGGAGE CARRIER
Filed Aug. 28, 1944
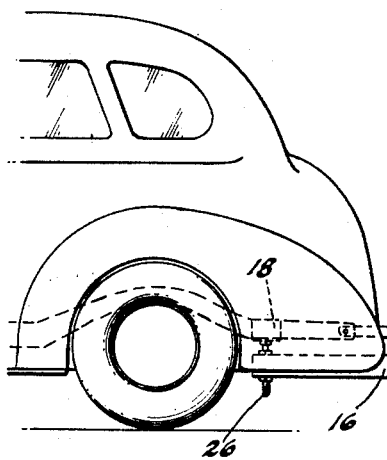
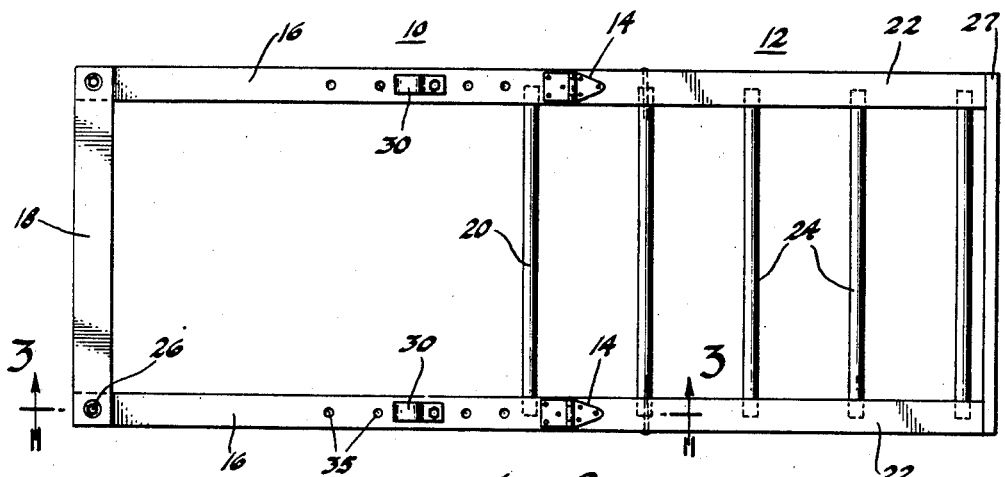
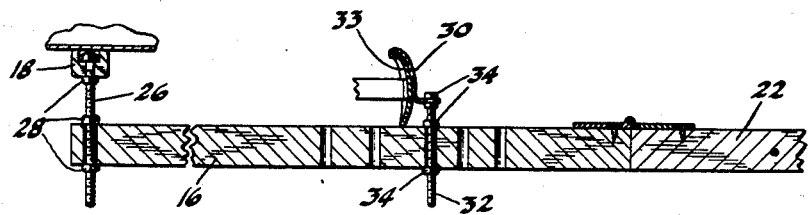
INVENTOR.
Henry O. Striker
BY Parker & Burton
attorneys Patented June 4, 1946

2,401,388

UNITED STATES PATENT OFFICE 2,401,388

DETACHABLE LUGGAGE CARRIER

Henry O. Striker, Ypsilanti, Mich.

Application August 28, 1944, Serial No. 551,504

1 Claim. (Cl. 224—29)

This invention relates to an improved detachable luggage carrier for the rear end of an automobile.

An object is to provide a detachable luggage carrier for the rear end of a passenger automobile which is of simple, strong and inexpensive construction and which is capable of being quickly attached to any conventional automobile or detached therefrom without altering in any way the structure of the automobile or without modifying or altering the vehicle to adapt it for attachment of the luggage carrier thereto.

A further object is to provide a luggage carrier adapted to be suspended from the rear bumper bar of an automobile, which luggage carrier extends underneath said bumper bar and is held upwardly thereagainst and has a bearing against the underside of the rear end of the frame of the vehicle. This luggage carrier is adapted to be attached to various makes of automobiles wherein the bumper bars may project varying distances rearwardly from the body and may be positioned at varying heights relative to the vehicle frames.

The luggage carrier is preferably so constructed as to be folded up and disposed within the rear trunk compartment of a passenger car body. It is of light weight construction and occupies a small space. It is adapted to be very quickly attached to or detached from the vehicle.

Other objects, advantages and meritorious features will more fully appear from the following description, appended claim and accompanying drawing, wherein;

Figure 1 is a side elevation of the improved luggage rack attached to the rear end of an automobile, Fig. 2 is a plan of the luggage rack shown in Fig. 1, Fig. 3 is a cross section on the line 3—3 of the luggage rack shown in Fig. 2.

Various types of luggage carrier racks have heretofore been provided for attachment to automobiles to increase the luggage carrying capacity of the conventional touring car. The purpose of these luggage racks is obvious but a disadvantage which has attended the use of many of them is the necessity of modifying the automobile structure to receive securing means whereby the rack was attached to the frame or body of the automobile. This improved luggage carrier is adapted to be very quickly attached to any conventional automobile without any modification thereof and to be as quickly detached therefrom when not desired for use.

The luggage carrier comprises a platform or rack which is preferably formed in two hinged sections, namely; a front section 10 hinged to a rear section 12 by hinges 14 to permit the rear section to fold over and lie on top of the front section or to be unfolded to serve as an extension thereof as shown in the figures of the drawing. The front section 10 is made up of a pair of side rails 16 held in spaced apart relationship at the front end by a bearing plate 18 and at the rear end by a cross member 20. The rear section 12 is made up of a pair of side rails 22 held in spaced apart relationship by cross members 24 and an end rail 27.

The bearing plate 18 is secured to the side rail 16 on the front section by bolts 26 and nuts 28 whereby the bearing plate might be adjusted vertically relative to the side rail 16. A pair of hangers 30 are provided to engage over the rear bumper 33 of an automobile, as shown in Fig. 1. Each hanger is mounted upon a bolt 32 which bolt is provided with a series of nuts 34 to secure the hanger thereto and also to secure the bolt in vertically adjusted position with respect to the side rail 16 of the frame as shown in Fig. 3. The side rails are provided with a plurality of bolt apertures 35 to permit adjustment of the hangers along the side rails.

When not in use the two sections of the rack may be folded together to facilitate storage. When in use the hangers are engaged over the rear bumper of a vehicle as shown in Fig. 1 and the bearing plate 18 bears against the under surface of a portion of the vehicle body. The nuts 28 are adjusted on the bolts 26 to position the bearing plate 18 at the desired height above the side frame member 16 to locate the luggage carrier rack properly.

To the same end, the hangers 30 are adjusted vertically with respect to the side rails to engage the bumper and the nuts are drawn up to bring the side rails up into engagement with the under part of the bumper bar. When the hangers are adjusted to draw the side rails of the carrier up against the rear bumper and the bearing plate 18 is properly adjusted to bear against the under side of the body, the rack will be supported to extend rearwardly from the vehicle as shown and will carry a substantial amount of luggage or any other article of a size suitable to be supported thereupon. When not in use the rack may be folded and placed within the trunk compartment of a vehicle.

What I claim is:

A luggage carrier adapted for attachment to the rear end of an automobile equipped with a rearwardly projecting bumper bar comprising a luggage supporting platform, a bearing plate extending transversely across the front end of the platform spaced above the plane of the platform and adjustable upwardly toward and away from the plane of the platform, a pair of hanger clamps carried by the platform spaced rearwardly from the bearing plate and projecting upwardly from the platform, said hanger clamps being engageable over the bumper bar and operable to draw the platform upwardly against the underside of the bumper bar, said hanger clamps being adjustable toward and away from the bearing plate.

HENRY O. STRIKER.